United States Patent [19]

McCracken

[11] 4,296,952
[45] Oct. 27, 1981

[54] ROTARY JOINT

[75] Inventor: Donald G. McCracken, Horton, Mich.

[73] Assignee: Aeroquip Corporation, Jackson, Mich.

[21] Appl. No.: 61,598

[22] Filed: Jul. 30, 1979

[51] Int. Cl.³ .............................................. F16L 00/00
[52] U.S. Cl. ..................................... 285/98; 285/276; 285/375
[58] Field of Search .................. 285/276, 381, 375, 98

[56] References Cited

U.S. PATENT DOCUMENTS

| 1,117,762 | 11/1914 | Barcus | 285/375 X |
| 2,676,039 | 4/1954 | Hubig | 285/375 X |
| 2,723,136 | 11/1955 | Deubler | 285/276 X |
| 2,797,108 | 6/1957 | Royer | 285/281 X |
| 3,433,488 | 3/1969 | Grantom | 285/276 X |
| 3,497,244 | 2/1970 | Grantom | 285/276 X |
| 3,514,127 | 5/1970 | Brooker | 285/276 X |

FOREIGN PATENT DOCUMENTS

| 1185248 | 2/1959 | France | 285/276 |
| 449351 | 4/1968 | Switzerland | 285/281 |

OTHER PUBLICATIONS

Aeroquip Catalog 867, Aeroquip Corporation, Jackson, Mich. 49203.
Deublin Catalog, pp. 24–25, Deublin Company, Northbrook, Ill.

Primary Examiner—Dave W. Arola

[57] ABSTRACT

A rotary joint utilizing a single anti-friction bearing interposed between the static and dynamic components wherein a self-aligning or floating seal is utilized to maintain effective sealing in the event of misalignment. The rotary joint includes a bearing supported sleeve to which a conduit adapter may be affixed in such a manner to mount and locate the bearing on the sleeve, and the components are economically manufactured wherein a dependable and efficient rotary joint may be produced at low cost.

5 Claims, 4 Drawing Figures

ROTARY JOINT

BACKGROUND OF THE INVENTION

Rotary joints are utilized to establish communication between a fixed conduit system and rotating member, such as a heating or cooling drum. The joint includes a housing having a chamber defined therein having a port for communicating with a fixed conduit system, and a rotary member, such as a sleeve or nipple, is located withing the housing and supported thereon by bearings. Sealing means establish fluid tight seals between the housing and the rotatable sleeve, and the sleeve is coaxially aligned with the rotating member being serviced. With rotary joints, the life and efficiency is related to the ability of the seal to remain efficient and operative, and a wide variety of sealing arrangements have been employed with rotary joints.

While rotary joints utilize both friction and anti-friction bearings, it is highly desirable in many applications to employ anti-friction bearings, and in such joints it is the practice to use a pair of ball bearings mounted upon a tubular sleeve axially spaced relative to each other in order to assure concentricity of the sleeve to the bearing and housing during operation. The use of a pair of ball bearings is expensive, but it is the common practice to use the bearings in pairs in order to achieve axial rigidity and prevent misalignment which would adversely affect the sealing as provided by known rotary joint seal assemblies.

From a cost standpoint, it is preferable to use only a single anti-friction bearing in a rotary joint. However, difficulties encountered with respect to maintaining alignment between the rotary and stationary components with attendant problems of maintaining seal integrity render single anti-friction bearing joints usable in only relatively few applications, and floating seals are sometimes used which have self-aligning capabilities.

It is an object of the invention to provide a rotary joint utilizing a single anti-friction bearing between static and dynamic components, and wherein self-aligning sealing apparatus is employed which is of an economical construction, and may be readily installed.

An additional object of the invention is to provide a rotary joint employing a single anti-friction bearing wherein a floating and self-compensating seal assembly is used which automatically accommodates itself to misalignment with respect to the axis of joint rotation, and wherein wear is automatically compensated for by means of biasing structure.

Yet an additional object of the invention is to provide a rotary joint utilizing a single anti-friction bearing wherein the bearing supports a rotating sleeve received within the bearing inner race, and an adapter removably affixed to the sleeve laterally engages the inner bearing race locating and positively retaining the sleeve within the inner bearing race.

Additionally, an object of the invention pertains to rotary joint structure wherein an economical joint may be produced having a relatively wide range of self-alignment, and wherein a variety of conduit attaching adapters associated with an inner sleeve may be selectively mounted upon the sleeve, and wherein the adapter aids in maintaining the sleeve in operative relationship with anti-friction bearing means.

In the practice of the invention a housing includes a chamber defined therein communicating with at least one port associated with a fluid supply or discharge conduit. A single anti-friction ball bearing is mounted within the housing chamber and a tubular sleeve is located within the bearing inner race and positively associated therewith by a threaded adapter mounted upon the sleeve and engaging a lateral side of the inner bearing race.

A seal assembly is interposed between the sleeve and the housing having a sealing surface which lies in a plane substantially perpendicular to the sleeve axis of rotation, and the sealing assembly includes an annular sealing surface against which an annular seal ring is biased by a compression spring. The seal ring is maintained in place by a resilient elastomer support ring slidably supported within the housing, and this resilient support ring permits the seal ring to compensate for deviation of the sealing surface from the true axis of rotation, the elastomer permitting the seal ring to maintain a sealing relationship with the sealing surface defined on the sleeve, and the spring insuring an effective seal between the seal ring and sealing surface regardless of whether the rotation of the sleeve is true.

A radially extending shoulder is defined upon the sleeve adapted to engage a lateral edge of the inner bearing ring, and a conduit adapter threaded upon the sleeve engages the opposite bearing inner race lateral edge whereby threading the adapter upon the sleeve positively locks and positions the sleeve relative to the bearing inner race. The adapter may take any desired form, such as male threaded, female threaded, or the like, and the entire rotary joint apparatus is of an economical construction which may be readily manufactured by high production techniques.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figure 1:
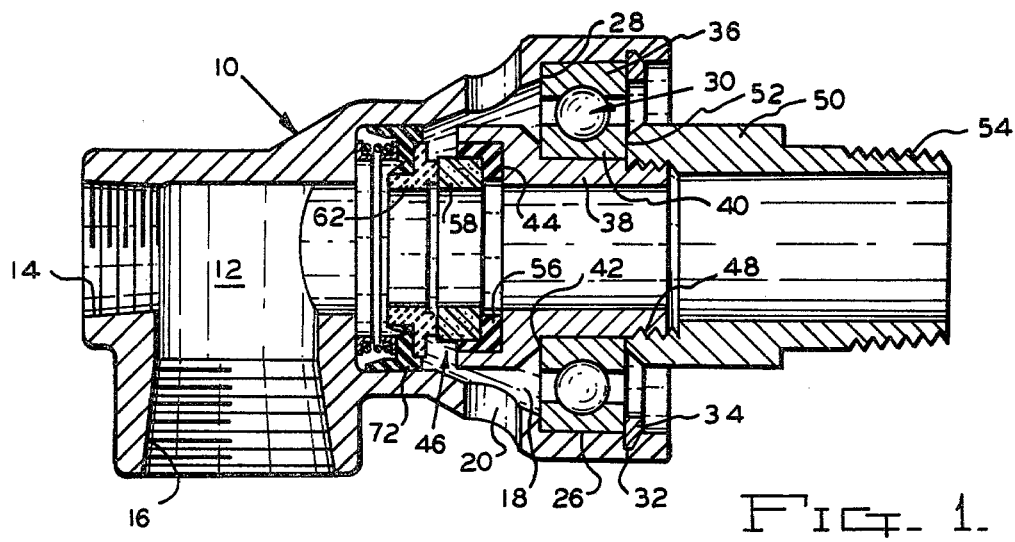
FIG. 1 is a diametrical, elevational, sectional view of a rotary joint in accord with the invention.
Figure 2:
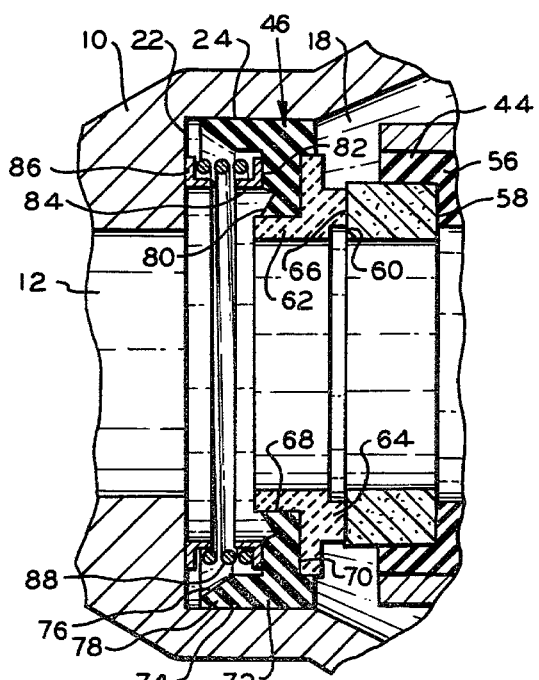
FIG. 2 is an enlarged, detail, diametrical, elevational, sectional view of the seal assembly.

With reference of FIGS. 1 and 2, a rotary joint in accord with the invention includes a housing 10 which may be formed of either metal of synthetic plastic. The housing includes a passage 12 communicating with threaded ports 14 and 16, and if desired one of these ports may be plugged, or conduits associated therewith, not shown.

A chamber 18 is defined within the housing 10 and is vented through vents 20. The chamber 18 includes a radial shoulder 22 intersecting cylindrical surface 24, and a cylindrical surface 26 intersecting radial shoulder 28 defines a bearing receiving recess into which anti-friction ball bearing 30 is mounted. A recess 32 receives a split retaining ring 34 engaging a lateral side of the bearing outer race 36 whereby axial displacement of the bearing relative to the housing 10 is prevented.

A tubular sleeve 38 includes a cylindrical surface closely received within the bearing inner race 40. Sleeve 38 includes a radial shoulder 42 engaged by one lateral side of the inner race 40.

The sleeve 38 includes a recess 44 adapted to receive a portion of the seal assembly 46, and at the opposite end of the sleeve external threads 48 are defined upon which the adapter 50 is threaded.

The adapter 50 is of a tubular configuration having internal threads which mate with the sleeve threads 48, and the end 52 of the adapter engages a lateral side of the bearing inner race 40 forcing the inner race against the sleeve shoulder 42 thereby firmly mounting to the sleeve to the inner race. The adapter shown in FIG. 1 is externally threaded at 54 whereby the adapter may be threaded into an opening or a pipe coupling, not shown, for association with drum related structure, or the like.

The rotary joint seal assembly generally indicated at 46 includes an annular elastic cushion 56 which is received within the sleeve recess 44. The cushion 56, in turn, includes a recess in which the annular circular seal element 58 is mounted having a flat sealing surface 60 defined thereon which lies in a plane perpendicularly disposed to the axis of the bearing 30 and sleeve 38. The element 58 may be formed of ceramic, iron or stainless steel.

A seal ring 62, which may be formed of synthetic plastic or carbon, includes an annular projection 64 defining a flat sealing surface 66 sealingly engaging the seal surface 60. The seal ring 62 includes an axially extending cylindrical surface 68 which intersects the radial surface 70, and these two surfaces define a recess in which the annular static seal support member 72 is received. The support member 72 is formed of an elastic material and includes an outer cylindrical surface 74 which closely engages the housing cylindrical surface 24 in a frictional, yet axially slidable, relationship. The support member 72 is provided with a tapered surface 76 defining a lip 78, and likewise the portion 80 constitutes a lip whereby pressure within the housing will force the lips against the supporting surfaces 24 and 68 to produce fluid-tight seals therewith.

The support member 72 includes a radially extending surface 82 against which the collar 84 of a spring assembly engages. A similar collar 86 engages the housing surface 22, and compression spring 88 imposed between the collars will produce a biasing force on the support member 72 and seal ring 62 toward the right, FIG. 1, which is substantially uniformly distributed about the configuration of the elastic support member 72.

In use, the adapter 50 is threaded into the drum or other ratating part to which pressurized fluid medium is supplied, or withdrawn, and supply or exhaust conduits are threaded into the port or ports 14 or 16 of the housing 10. As the sleeve 38 rotates relative to the housing 10 the seal ring 62 will maintain a sealed relationship with the sealing surface 60 due to the flexible support of the seal ring provided by the elastomeric support member 72. Assuming that a pressurized fluid is being transmitted through the rotary joint, the fluid pressure exerted upon the support member 72 will cause the support member and seal ring 62 to function as a piston maintaining the seal ring in firm engagement with the seal surface 60, and if the sleeve 38 is slightly out of alignment with the axis of the bearing 30 the nutating action of the seal ring 62 will be compensated for by the ability of the seal ring to follow such erratic movement of the sealing surface 60 because of the elastomeric character of support member 72.

The presence of the spring 88, and associated collars, assures that a tight sealing engagement between the seal ring 61 and sealing surface 60 occurs even when the rotary joint is not under pressure, or if a subatmospheric pressure exists within the rotary joint. The frictional engagement of the support member 72 to the surface 24 eliminates the need for pins or keys to prevent relative rotation, and the seal assembly components are of a simple form which may be readily manufactured commercially at little cost.

Figure 3:
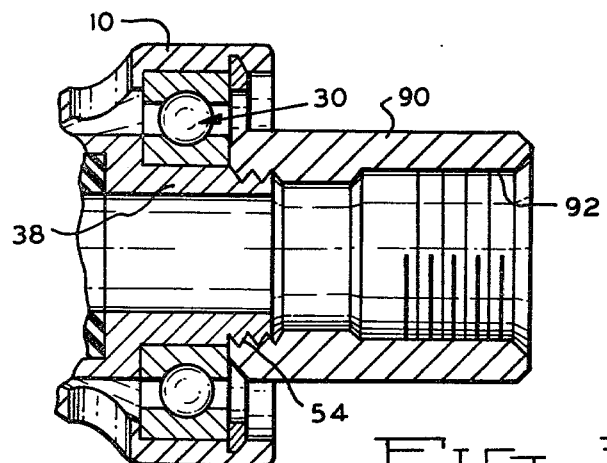
FIG. 3 is a detail, elevational, sectional diametrical view of the rotary joint illustrating another embodiment of adapter.

In FIG. 3 a modification of tubular adapter 90 is illustrated having internal threads 92 for threading upon the sleeve 38 as described above. However, the adapter 90 is internally threaded for eliminating the need for a coupling.

Figure 4:
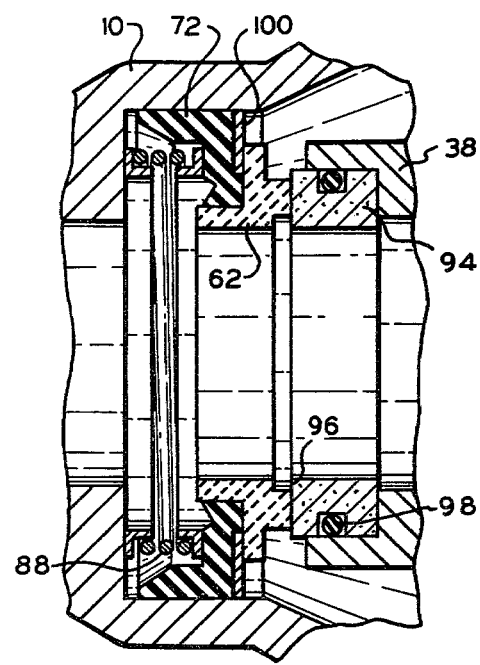
FIG. 4 is an enlarged, detail, elevational sectional view of a modification of seal assembly for use within high pressure installations.

In FIG. 4 a variation of seal assembly is shown which is particularly suitable where very high pressures are transmitted through the rotary joint. In FIG. 4, the annular element 94 defining sealing surface 96 is not mounted within a resilient cushion, but an O-ring 98 is used to prevent the escape of fluid from around the element. Additionally, a rigid washer 100 formed of metal, or the like, is located as illustrated, and may be either embedded in the support member 72 or the support member 72 may be recessed to accommodate the same. The presence of the washer 100 prevents the elastic material of the support member from being "extruded" past the seal ring 62.

It will be appreciated from the aforedescribed description that the invention results in a low cost rotary joint of simplified construction wherein a single antifriction bearing may be employed, and yet dependable and long wearing high sealing efficiencies can be maintained.

It is appreciated that various modifications to the inventive concepts may be apparent to those skilled in the art without departing from the spirit and scope of the invention.

I claim:

1. A rotary joint comprising, in combination, an annular housing having a first port in communication with a chamber defined therein, a single annular anti-friction bearing mounted upon said housing within said chamber, a tubular sleeve mounted within said bearing for rotation within said chamber about an axis, a second port defined by said sleeve communicating with said chamber, an annular elastic cushion mounted on said sleeve adjacent said second port, an annular rigid seal element supported upon said cushion defining an annular radially disposed sealing surface defined on said sleeve concentric with said axis, an annular seal within said chamber concentric with said axis sealingly and slidably engaging said sealing surface, annular resilient seal support means sealed with respect to said housing flexibly supporting said annular seal and constituting the sole support of said seal whereby said seal is self-aligning with respect to said sealing surface, a cylindrical surface defined in said chamber coaxial to said axis, said seal support means comprising an elastomeric ring having a first lip seal portion sealingly engaging said cylindrical surface, a cylindrical surface defined on said annular seal coaxial to said axis, said ring having a second lip seal portion engaging said seal cylindrical surface wherein said seal is supported within said ring, fluid pressure within said housing biasing said seal into engagement with said sealing surface and said lip seals into sealing relation to their associated cylindrical surface.

2. In a rotary joint as in claim 1, a spring within said chamber engaging said ring axially biasing said ring and seal toward said sealing surface.

3. In a rotary joint as in claim 1, an annular adapter releasably affixed to said sleeve in communication with said second port, and conduit attachment means defined on said adapter.

4. In a rotary joint as in claim 3, an annular thread defined on said sleeve, said bearing including an inner race engaging a radial shoulder defined on said sleeve, threads defined on said adapter for mating with said sleeve threads, said adapter engaging said bearing inner race affixing said inner race to said sleeve.

5. In a rotary joint as in claim 1, an anti-extrusion rigid ring located between said seal and said elastomer ring to prevent extrusion of said elastomer due to the pressure within said housing.

* * * * *